Figure 1B:
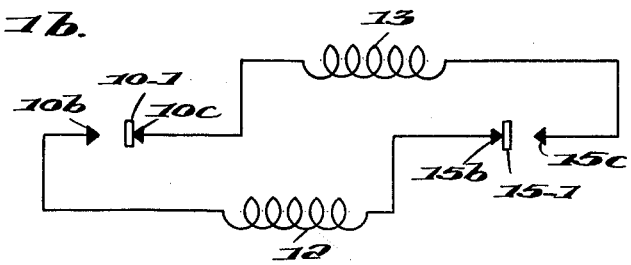

April 20, 1965 J. CARTON 3,179,865
SELF-BALANCING SERVO SYSTEM WITH SUPERIMPOSED ALTERNATING
CURRENT FOR REDUCING STATIC FRICTION
Filed March 27, 1962 2 Sheets-Sheet 1
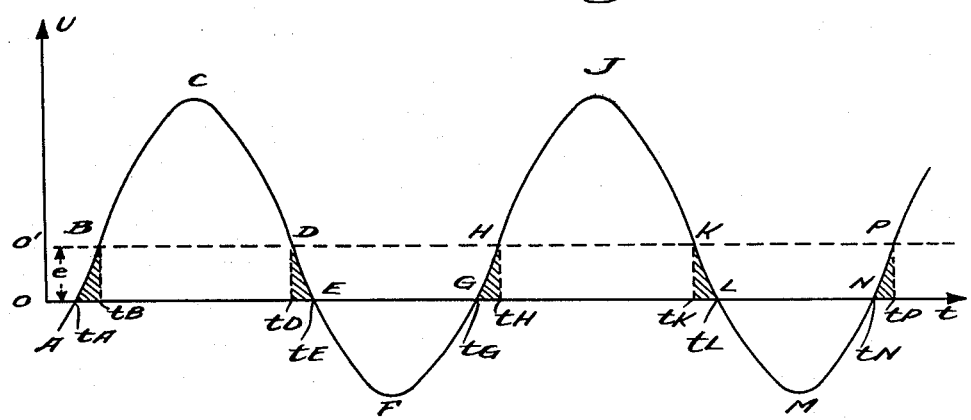
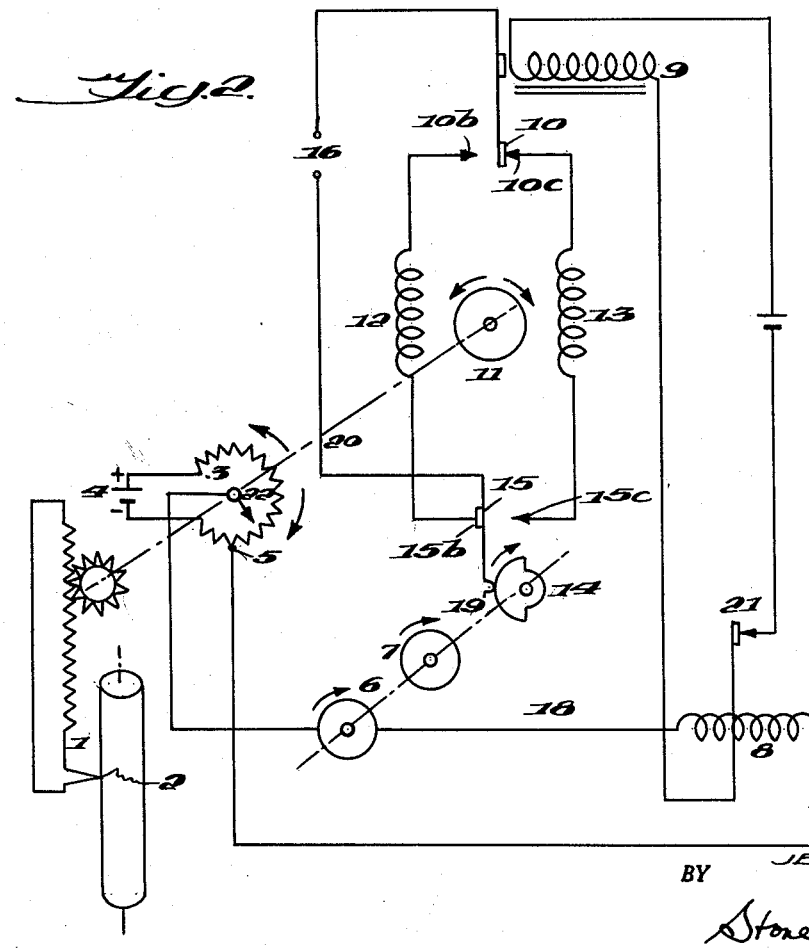
INVENTOR.
JEAN CARTON,
BY
Stone + Mack.
ATTORNEYS INVENTOR.
JEAN CARTON,
BY
Stone & Mack.
ATTORNEYS

United States Patent Office

3,179,865
Patented Apr. 20, 1965

1

3,179,865
SELF-BALANCING SERVO SYSTEM WITH SUPER-IMPOSED ALTERNATING CURRENT FOR REDUCING STATIC FRICTION
Jean Carton, 9 Rue Brown Sequard, Paris 15, France
Filed Mar. 27, 1962, Ser. No. 182,803
Claims priority, application France, Nov. 14, 1957,
751,536, Patent 1,192,277
3 Claims. (Cl. 318—28)

This application is a continuation-in-part of application Serial Number 773,939, now abandoned, Jean Carton, filed November 14, 1958, for servo-mechanisms.

The invention relates to equipment of the type including an electrical circuit and means for superimposing an alternating voltage on the error signal voltage whereby effects such as friction near the equilibrium position are reduced by a first changeover device actuated at each half period of said alternating voltage by a motor driving an alternator which produces said alternating voltage, a second changeover device responsive to the sign of the resultant of said alternating voltage and said error signal voltage, a second motor controlling the manipulated variable and controlled by said changeover devices, the phase of operation of said two changeover devices being such that the second motor remains inoperative when the error signal is zero and upon the occurrence of an error signal always rotates in the direction the effect of which is a reduction of the error signal.

Great improvements may be effected in measuring and adjusting apparatus and generally to electrical control and recording systems by superimposing an alternating voltage on the difference between the voltage to be measured or adjusted and the voltage indicated in the measuring or adjusting system.

Such improvements are already known and the present invention has for an object to provide further improvements to control and recording systems as will be hereinafter described.

It may be assumed that the alternating voltage whose period shall be designated by T is positive during one half of its period and negative during the other half of its period. This assumption may be made because it is only necessary to add a constant value to any form of alternating signal in order to obtain this result.

If the above voltages are disposed in such a manner that the control signal is equal to the sum of the difference or error voltage and of the alternating voltage, the durations during which, within one period, the control signal shall be respectively positive and negative, will be equal if the error voltage is zero. They will be unequal if the error voltage is not zero.

The difference in these durations, for given characteristics of the form and of the amplitude of the alternating voltage, shall be a function of the value of the error voltage.

The average speed of variation of the measured or feedback voltage will thus be a function, for a complete period of alternating voltage, of the product of the relative difference of the two above durations and the speed V which the control motor operates on the feedback voltage.

It is found in the above arrangement that the feedback voltage, even if its average value is constant, varies during a period (an oscillatory period of the alternating voltage) between two extreme values and that the difference between these extreme values is proportional to the product of the speed V and half the alternating period T. From this, there thus results, as is disclosed for example in U.S. Patent 2,460,638, C. M. Gilbert, an oscillation of the measured or feedback voltage about its average value, with an amplitude proportional to $$A = \frac{VT}{2}$$

If it is desired to reduce the amplitude of this oscillation, it is necessary to reduce either the speed V, or the period T, or both. However, the reduction of the speed V has, as an immediate consequence, a reduction, in the same proportion, of the speed of response of the system. This may have serious drawbacks beyond certain limits.

The present invention enables the above described oscillations of the system to be suppressed without in any way reducing the speed of response of the system or modifying the alternating period.

In a system according to the invention, if the error voltage is zero, the action of the control device is zero. If the error voltage is not zero, it will only be possible for the action of the control device to be carried out when the control signal will be of the sign for which the measured or feedback voltage varies in order to reduce the error voltage in the case where this reduction is not to be followed by a temporary corrective increase due to the oscillations of the alternating voltage.

Owing to this considerable improvement, the measured or feedback voltage, instead of oscillating about an average value of the oscillations of the alternating voltage, will follow the average between the upper envelope and the lower envelope of the peaks of the elongations of these oscillations.

In order to illustrate the facts above set forth, reference should be made to FIGURES 1a, 1b, 1c, 1d, 1e and 2 shown in the drawings accompanying this application, in which:

FIG. 1a is a curve illustrating the characteristic action of the apparatus shown in FIG. 2 and FIGS. 1b, 1c, 1d, and 1e are diagrams of the motor control circuits in various characteristic actions of the changeover switches; and FIG. 2 shows an embodiment of a control and recording system according to this invention.

By way of a non-limiting example, an embodiment of a servo-mechanism according to this invention is described hereinafter with reference to FIGURE 2 of the drawings.

In this embodiment the quantity to be measured is an electrical voltage applied at 17 and the measured or feedback voltage is the elongation of the stylus 1 of a graphic recorder 2. This stylus 1 is mechanically connected to the slider 22 of a potentiometer 3, through which flows a direct current supplied by a battery 4. The electrical voltage between this slider 22 and a fixed tapping point 5 on the potentiometer constitutes an auxiliary or feedback voltage of the same nature as the voltage to be controlled and which is opposed to the latter in a circuit 18. The difference between the voltage to be controlled and the potentiometer voltage constitutes the error voltage such as defined above.

The alternating voltage is produced by a small permanent magnet alternator 6, whose rotor is driven at constant speed by an auxiliary motor 7 fed by any suitable source. In the circuit 18, the error voltage and the alternating voltage are applied in series to the terminals of a contact galvanometer 8 embodying the conventional pointer. The combination of these two voltages constitutes the control signal. The contact 21 of this galvanometer opens or closes the circuit of a relay 9 comprising a changeover switch or a movable contact 10 and two fixed contacts 10b and 10c.

The control motor 11 has a winding 12 which, when an auxiliary energy source 16 is applied to it, causes the motor to rotate in one direction and a winding 13 which, when the same source is applied to it, causes the motor to rotate in the reverse direction and at the same speed.

The auxiliary motor 7, which drives the alternator 6, producing the alternating voltage, drives simultaneously by the same shaft 19, a cam 14 acting on a changeover switch 15, comprising a movable contact 15 between two fixed contacts 15b and 15c.

Each of the windings of the control motor is connected to one of the fixed contacts 10b or 10c of the movable contact 10 actuated by a relay 9 and to one of the fixed contacts 15b or 15c of the changeover switch 15 actuated by the cam 14, the movable contacts being connected to the auxiliary energy source 16. Thus the control motor 11 can only rotate if the movable contact 10 of the relay 9 and the movable contact of the changeover switch 15 are respectively and simultaneously resting on the fixed contacts which are both connected to one of the two windings 12 and 13.

The contact galvanometer 8 is so connected that the relay 9 closes the particular one of the contacts 10b and 10c which would enable the control motor 11 to rotate in a direction such that the error voltage is reduced in absolute value.

As regards the cam 14, it is designed and shaped so that during a half of its rotation (and therefore during a half period of the alternating voltage) it closes the contact 15b, whilst during the other half of its rotation, it closes the contact 15c and it is arranged in such a manner that with the alternator 6 rotating at constant speed, and if the error voltage is zero which brings about in the circuit 18 and in the contact galvanometer 8 the consequence that the action of the came interrupts at 15b or 15c the circuits of the control motor, during all the time during which the relay 9 (whose contact position only depends upon the direction of the alternating voltage applied to the galvanometer 8) closes at 10b or 10c the same circuit of the control motor.

It results that from this arrangement of the cam 14 and its action on the changeover switch 15, as well as from the arrangement of the system described, in that which concerns particularly the contact galvanometer 8 and the relay 9; on the one hand the changeover switch 15 permits the alternating supply of one or the other of the windings (for example 12) of the control motor 11, in the course of an oscillation period of the alternating voltage, (that is to say in the course of the period of the voltage produced by the alternator 6) only during a time equal to the half of this period (and the same for each successive period of this voltage) and on the other hand the winding 12 will only be energized with the double condition that the cam 14 is in the half period corresponding to this energization, and that the relay 9 be operated in a corresponding suitable direction, during at least a fraction of the time during which the changeover switch 15 enables the energization of the winding 12 under consideration. It results that the control motor 11 will be stopped at each time that these two conditions are not fulfilled simultaneously, that is to say, as desired, at each time that the superposition of the alternating to the error voltage (error signal) tends to make the control signal oscillate.

It has been supposed in this example that the contact of the galvanometer 8 opens (or closes) when the control signal passes by a zero value. If the adjustment were made in another manner there would result a displacement of the zero of the recording apparatus, but the operation would not otherwise be altered.

The device operates as follows. The starting position is that shown in FIGURE 2. In this position it may be assumed that the initial electric voltage applied at 17 is $U_1$ (assumed to be positive). The slider 22 of the potentiometer 3 is in a position, let use say, $S_1$ and the stylus of the recorder is in a position, let us say, $T_1$. The alternator 6 producing the alternating voltage is driven at constant speed by the motor 7 as is also the cam 14. Should the system be in equilibrium the voltage $U_1$ is equal to the voltage $V_1$ taken from the slider 22 in the assumed position $S_1$ and the voltage which, in the circuit 18 results from the opposition of the two voltages $U_1$ and $V_1$, is nil. In this circuit 18 is found on the contrary the alternating voltage produced by the alternator 6. This voltage acts on the contact galvanometer 8 and through the latter on the relay 9 so that the movable contact 10 firstly contacts contact 10b when the changeover switch 15 is on contact 15c and then contacts the contact 10c when the changeover switch 15 is on contact 15b. It thus results that the control motor 11 is never fed and remains stopped.

If now the voltage applied to 17 suddenly becomes $U_2$, let us say, of a positive value greater than the initial voltage $U_1$, there is first of all in the circuit 18 (besides the alternating voltage) an initial resultant voltage equal to $U_2$ minus $V_1$, before the control motor 11 starts. This resultant voltage acts on the contact galvanometer 8 by maintaining its contact 21 longer in one of the open or closed positions than in the other of these two positions. It therefore results that the movable contact 10 of the relay 9 finds itself during each alternation of the alternating voltage from alternator 6, longer in contact with one of the fixed contacts 10b, 10c (the contact 10b for example) than in contact with the other. Consequently the movable contact 10 is then, during a certain fraction of each alternation, in contact with 10b at the same time as the changeover switch 15 is in contact with 15b. During this fraction of each alternation the motor 11 is then supplied through the winding 12 in the direction which operates the slider 22 so as to increase the voltage between the slider and the point 5. It therefore results that this voltage will increase (in the hypothetical example chosen) from the value $V_1$ up to a value $V_2$ equal to $U_2$. At this moment on the one hand the stylus 1 will have been displaced (at the same time as the slider 22) until it is in a position, let us say, $T_2$ corresponding to the voltage $V_2$ and on the other hand the system finds itself in a situation analogous to the starting situation indicated above, such that, despite the existence of the alternating voltage, the control motor 11 is no longer energized until there is produced a new modification of the voltage applied at 17.

Since one of the objects of the invention is to reduce the effects due to certain disturbances such as friction in the vicinity of the equilibrium position, an alternating voltage has been superposed on to the error voltage. However, the latter is manifested at the output of the control device by oscillations which it is desirable to avoid. Therefore, there is applied to the control motor 11, by two different paths:

(a) A control signal which is a function of the error voltage and of the alternating voltage, by means of the changeover switch contact 10;

(b) A compensation signal during each half-period by means of the changeover switch contact 15.

These two series of signals partially compensate each other and thus the motor will always rotate in the same direction and will always act towards a reduction of the error voltage. The operation of the apparatus may be further understood by studying two very distinct cases, successively.

(1) *The case where the error voltage is zero*

In this case the system must not transmit any signal to the control motor. The potential difference at the terminals of the potentiometer 3 and tap 5 and the potential difference at the terminals 17 are equal. The potentiometer or feedback voltage should not vary, that is to say the rotation of the motor must be zero and thus independent of the alternations. The potential difference applied to the contact galvanometer 8 is thus only the alternating voltage intended to reduce the frictions in the vicinity of the equilibrium position. The shape of the cam 14 is such that when the contacts 21 and 10 are in the positions of FIGURE 2, the motor will not be excited at any moment. In fact, at each half-period of alternation, the cam 14 rotates by a half rotation and the changeover switch contact 15 changes over. The alternating voltage, as well as the strength of the current in the circuit 18, changes its sign and the contact 21 moves to its other position and so does changeover switch contact 10. The control motor 11 is therefore not excited, since twice in a period all the contacts change.

To summarize, the position of the changeover switch contact 10 is a function of the alternating voltage and of the error voltage which is zero in this case. The position of the changeover switch contact 15 is only a function of the period of alternation and its effect on the excitation of the motor 11 cancels that of the changeover switch contact 10.

The principle of the invention does relate to oscillations superposed on an error voltage, which is the difference between the voltage to be measured and the measured or feedback voltage. In this invention the oscillations decrease the frictions of a system in the vicinity of its equilibrium position. In prior art systems, these oscillations are in the last resort transmitted to the control motor, which has the drawback of disturbing the response to the system. This no longer applies in this case. The voltage generated by the alternator 6 is no longer superposed in any way on the response of the control motor given in the case of FIGURE 2 by reading the pointer 2. Nevertheless the alternating voltage does exist in the circuit 18; it on contact galvanometer 8 by reducing its frictions in the vicinity of the equilibrium and renders it more sensitive in the vicinity of this equilibrium position. However, and this is an essential fact, these oscillations are not transmitted to the slider 22, because as a consequence of the device of this invention, the motor 11 cannot rotate in this case either in one direction or in the other direction; because the two movable contacts of the change over switches 15 and 10 function simultaneously. They are both controlled by the alternating voltage existing alone in the circuit 18. The first, changeover switch 15, is controlled by means of the alternator 6 which produces this voltage and by the cam 14. The second, changeover switch 10, is controlled by means of the contact galvanometer 8 whose pointer releases the operation of changeover switch contact 10 by means of 21 and 9 whenever the alternating voltage passes by a zero value.

(2) *The case where the error voltage is not zero*

In this case the voltage at the terminals of the potentiometer 3 and tape 5 and the voltage at the terminals 17 are unequal. As in the preceding case, the response of the system must not be disturbed by the alternations. The voltage applied to the contact galvanometer 8 is thus the sum of the alternating voltage and of the error voltage. The contact 21 and the changeover switch contact 10 operate as soon as the potential difference applied to the galvanometer 8, as well as the current in the circuit 18, changes its sign. The changeover switch contact 10 changes the direction of rotation of the control motor 11, that is to say, the direction of variation of the potentiometer voltage. This being so, if the changeover switch contact 15 was completely short circuited, which would correspond to a conventional arrangement, the direction of rotation of the motor would be a function of the error voltage and would constantly oscillate. But the changeover switch contact 15 operates at each alternation, under the action of the cam 14, and also acts to reverse the direction of rotation of the motor 11. It thus prevents the motor from rotating in two directions and thereby cancels the disturbance effect on the motor 11 and the changeover switch contact 10. There is thus, as in the preceding case, a compensation which cancels the effects of the alternations on the potentiometer voltage. The shape of the cam 14 must be such that the direction of rotation of the motor 11 corresponds only to a reduction of the error voltage.

In the circuit 18, this error voltage coexists with the alternating voltage. The changeover switch contact 15, controlled by the alternator 6 and the cam 14, still functions as in the case when the error voltage is zero. In other words, the contact 15 is completely unaware of the existence of the error voltage. The situation is completely different for contact 10, which is controlled from the galvanometer 8 and whose pointer is subjected to the resultant of the current of oscillations and of the error current. The operation of contact 10 will no longer be operated, as in the previous case, for the zeros of the alternating voltage, but for the zeros of the sum of the error voltage and of the alternating voltage. In contrast to the previous case, and this is the characteristic of the invention, the contacts 10 and 15 no longer operate simultaneously, and as a result, at certain moments, these contacts may have positions allowing the motor 11 to rotate in a certain direction. At other moments, also, the contacts may have positions where the motor 11 will rotate in the reverse direction. There will also be moments, when the contacts will have positions where the motor 11 will not rotate.

Briefly therefore, the principle of the system is based on the simultaneous or non-simultaneous operation of the two changeover switch contacts 10 and 15. The circuit of the motor 11 constitutes, as it were, a filter for transmission to the potentiometer 3 of the sum of the error voltage and of the alternating voltage; this filter prevents oscillations from passing and from being transmitted to the control system.

In the explanations which have already been made and in those which now follow, so that the reasoning may be clear, one supposes from the outset that the error voltage is constant during some periods of oscillations of the input voltage applied to the galvanometer 8.

Due to the fact that the alternating voltage is represented in FIG. 1a by a curve of sinusoidal appearance (the durations $t$ in abscissas and the voltages $U$ in ordinates), the sum of the deviation quantity $e$ and also of the alternating voltage is a curve A, B, C, D, E, F, G, H, J, K, L, etc.; of sinusoidal appearance.

If one did not employ the invention herein disclosed, the motor 11 would run continually. Hence, an object of the invention is to limit the functioning time of the said motor 11 to periods or intervals of time only where it operates effectively, to diminish the difference between the controlled voltage 17 and the potentiometer voltage and to prevent it from turning during interval periods of BCD, of EFG, of HJK, of LMN, and so on, given that the said time intervals correspond to intervals when action by the motor 11 is not desired.

This prevention of the motor 11 from turning during certain intervals is mechanically achieved by the aid of the cam 14 and the contact 15, which serves to break one of the circuits of the motor 11 and which therefore stops the motor, even if relay 9 has actually been excited, said motor could be fed through the contact 10 if there had been no break at the point of contact 15.

The result of this action of the cam 14 and of the contact 15 is that the motor 11 rotates (and besides that, always in the same direction so that the error voltage or difference voltage preserves a same sign) only during the intervals of time which correspond to the shaded portions in FIGURE 1, herewith.

The functioning of the device is analyzed in detail below, and supposes that the error signals to which the device applies itself are electrical voltages.

(1) *Indications concerning the functioning of the device when the error voltage is nil*

Only the alternating voltage shows itself in the circuit 18.

The curve of FIGURE 1a has the appearance of a sinusoid B, C, D, F, J, M and shows this voltage, the axis of abscissas being then represented by O'P.

Figure 1C:
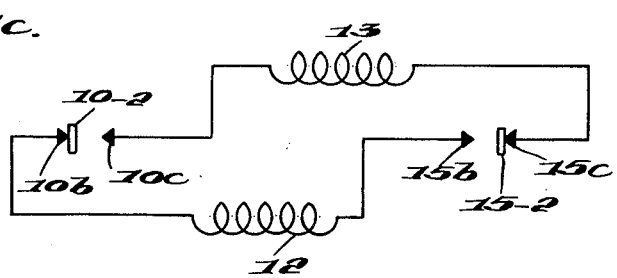

All the times that the alternating voltage nullifies itself at B, D, H, K, P . . . the movable contact 10, set in motion by the relay 9, changes position, with 10–1 in the position of 10–2 or inversely; as for the cam 14, it is moved by the motor 7 at the same speed of rotation by a second turn, so that when the frequency is delivered by the alternator 6, the cam is adjusted in such a way that the moving contact is in the position 15–1 when the moving contact 10 is in the position 10–1 (FIGURE 1b) and on the contrary the same moving contact 15 may be in position 15–2 when the moving contact 10 is in position 10–2 (FIGURE 1c). In these two cases of FIGURES 1b and 1c, one of the two circuits 12–13 of the motor 11 is interrupted. The latter (motor 11) consequently therefore remains motionless as well as the slide contact 22 of potentiometer 3, as it should since it was in the condition of no error voltage.

(2) *Indications concerning the functioning of the device when the error voltage is not nil*

On the FIGURE 1a, the error voltage is supposed positive and equal to $+e = 00'$.

The error voltage adds itself then to the alternating voltage in circuit 18.

The contact 15, the opening and the closing of which is mechanically effected by the cam 14, opens itself and closes itself exactly as in the previous case where the difference was nil. On the contrary, the contact 10 changes position whenever the resulting voltage annuls itself in the circuit 18, that is to say, at the intervals which correspond to the points A, E, G, L, N in FIGURE 1a, shifted with regard to the points B, D, H, K, P.

Figure 1D:
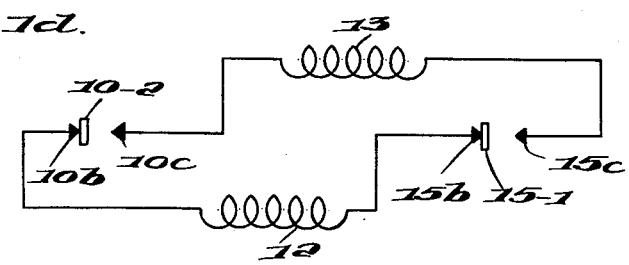
Figure 1E:
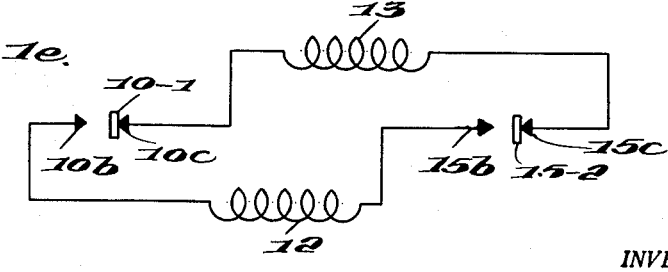

From this shift between A and B, and D and E, G and H, etc. . . . it results that the contacts 10 and 15 occupy successively not only the couple of positions simultaneously indicated by the FIGURES 1b and 1c, but also (according to the direction of the error) the one or the other of the couple of positions indicated respectively by the FIGURES 1d and 1e.

In the couple of positions which the contacts 10 and 15 respectively occupy on FIGURE 1d and on the FIGURE 1e, the motor 11 turns in one direction (FIGURE 1d) or to the contrary in the other direction (FIGURE 1e).

One may now specify the sequence of the movement of the motor 11 and then the functioning cycle of the device. In FIGURES 1b, 1c, 1d and 1e one has shown the two possible positions of the movable contact 10, respectively by 10–1 and 10–2, and the two possible positions of the contact 15, respectively by 15–1 and 15–2. Moreover, it should be remembered that the contact 15 changes position by the action of the cam 14 and that the contact 10 changes position when the relay 9 is excited.

One has shown by tA, tB, tC, tD, etc. . . . the intervals which correspond to the points A, B, C, D, etc. . . . of the curve in FIGURE 1a which represent the oscillations of the balancing quantity.

One supposes that before the abscissas tA, the contact 10 is in position 10–1 and the contact 15 in position 15–1, as in FIGURE 1b, this being obtained by a suitable adjustment of the cam 14.

In the intervals tA and tB, the contact 10 has changed position in abscissas tA of the curve of FIGURE 1a, whereas on the contrary the contact 15 remains in position 15–1, the positions of these two contacts are respectively 10–2 and 15–1 (FIGURE 1d). As a consequence, the motor 11 turns then in the direction which corresponds to the supply of current to the winding 12.

At the abscissas tB, the contact 10 rests in the position 10–2, when the contact 15 passes from 15–1 to 15–2. To start with the abscissas tB, the positions of the two contacts are then 10–2 and 15–2 (FIGURE 1c).

In consequence, none of the windings 12 or 13 are then supplied with current so that the motor 11 is then stopped.

At the abscissas tD, the contact 15 repasses in the position 15–1. The positions of the two contacts are then 10–2 and 15–1 (FIGURE 1d). In consequence, the motor 11 then turns in the intervals tD, and tE again in the same direction as between the intervals tA and tB. It stops itself finally at the abscissas tE since the contact 10 passes then in the position 10–1 and that, between the intervals tE and tG, the positions of the two contacts are respectively 10–1 and 15–1 (FIGURE 1b).

After the abscissas tC the two contacts 10 and 15 find themselves again in positions 10–2 and 15–1 (FIGURE 1d). The motor 11 then again turns, always in the same direction as before. As a consequence, in the case where the error is zero and in the direction 00' of FIGURE 1a, the motor 11 turns during the successive fractions of intervals (fractions which are moreover very brief) always in a certain direction which corresponds to the current supplying the winding 12; and it stops during some other fractions of intervals which are interposed between those turning intervals. It results from this that the action of the motor 11, constantly tends to lessen the error voltage without oscillations or the like.

In the case where the error voltage is in the direction inverse of the direction 00' of FIGURE 1a, the motor 11 is actuated exactly according to the same method, but turns in a direction inverse of the preceding case, since the positions of the contacts 10 and 15 are then no longer the positions 10–2 and 15–1 of FIGURE 1d, which causes one of the windings 12 and 13 to be supplied, positions which the above contacts no longer hold as simultaneous, but are the positions 10–1 and 15–2 of FIGURE 1e.

On the other hand, the reason given above in the case where the error is not nil, has been made in supposing that this not nil error holds a constant value 00' (FIGURE 1a), whatever renders the reasoning more clear. The method of reasoning and of functioning meanwhile remains analogous if the error 00' varies during the interval; thence it follows that the respective intervals of variations such as tA, tB, tD, tE, tG, tH, etc., . . . are then no more equal between them.

As an example, the control or recording system according to the invention may be employed for recording the temperature produced by a thermocouple, in which case the voltage produced by the thermocouple is applied to terminals 17.

Whilst a particular embodiment has been described, it will be understood that various modifications may be made without departing from the scope of this invention as defined in the following claims.

I claim:

1. An electrical control and recording system comprising a comparison circuit, means for feeding a first voltage to be recorded and a second voltage corresponding to a recorded value in series opposition to the comparison circuit, any difference between said two voltages appearing in said comparison circuit as an error voltage, means for introducing an alternating voltage into said comparison circuit in series with said error voltage, an electrically operated interrupter device connected in said comparison circuit and actuated in dependence upon the sum of said alternating voltage and said error voltage, a control motor for reducing to zero any error voltage and having two separate excitation windings, a power supply for said excitation windings, a relay whose energization is controlled by the interrupter device, a first changeover switch having a movable contact and two fixed contacts, said two fixed contacts being connected respectively to one end of each of the two excitation windings, means for controlling the movable contact of said changeover switch by the energisation of said relay, a second changeover switch having a movable contact and two fixed contacts, said two fixed contacts being connected respectively to the other end of each of said excitation windings, a cam device for controlling the movable contact of said second changeover switch, a motor operating in synchronism with the alternating voltage and driving same cam device to operate said second changeover switch so as to close the fixed contacts of said second changeover switch alternately in accordance with each half period of the alternating voltage; so that in the absence of an error voltage the first and second changeover switches are operated during any one period of said alternating voltage in opposite directions so as to prevent the energization of either of the two excitation windings of the control motor, and so that when an error voltage is present said first and second changeover switches operate to allow the energization of either of said excitation windings only when said control motor will operate to effect a reduction of said error voltage.

2. An electrical control and recording system comprising a comparison circuit, a potentiometer, means for feeding a first voltage to be recorded and a second voltage corresponding to a recorded value and derived from said potentiometer in series opposition to the comparison circuit, any difference between said two voltages appearing in said comparison circuit as an error voltage, means for introducing an alternating voltage into said comparison circuit series with said error voltage, an electrically operated interrupter device connected in said comparison circuit and actuated in dependence upon the sum of said alternating voltage and said error voltage, a control motor for reducing to zero any error voltage and having two separate excitation windings, a power supply for said excitation windings, means connecting said control motor to drive said potentiometer, a relay whose energisation is controlled by the interrupter device, a first changeover switch having a movable contact and two fixed contacts, said two fixed contacts being connected respectively to one end of each of the two excitation windings, means for controlling the movable contact of said changeover switch by the energisation of said relay, a second changeover switch having a movable contact and two fixed contacts, said two fixed contacts being connected respectively to the other end of each of said excitation windings, a cam device for controlling the movable contact of said second changeover switch, a motor operating in synchronism with the alternating voltage and driving said cam device to operate said second changeover switch so as to close the fixed contacts of said second changeover switch alternately in accordance with each half period of the alternating voltage; so that in the absence of an error voltage the first and second changeoever switches are operated during any one period of said alternating voltage in opposite directions so as to prevent the energisation of either of the two excitation windings of the control motor, and so that when an error voltage is present said first and second changeover switches operate to allow the energisation of either of said excitation windings only when said control motor will operate to drive said potentiometer to effect a reduction of said error voltage.

3. An electrical control and recording system comprising a comparison circuit, a potentiometer having a slider, a recording device operated by movement of the slider of said potentiometer, means for feeding a first voltage to be recorded and a second voltage corresponding to a recorded value and derived from said potentiometer in series opposition to the comparison circuit, any difference between said two voltages appearing in said comparison circuit as an error voltage, an alternator for introducing an alternating voltage into said comparison circuit in series with said error voltage, an electrically operated interrupter device connected in said comparison circuit and actuated in dependence upon the sum of said alternating voltage and said error voltage, a control motor for reducing to zero any error voltage and having two separate excitation windings, a power supply for said excitation windings, means connecting said control motor to drive the slider of said potentiometer, a relay whose energisation is controlled by the interrupter device, a first changeover switch having a movable contact and two fixed contacts, said two fixed contacts being connected respectively to one end of each of the two excitation windings, means for controlling the movable contact of said changeover switch by the energisation of said relay, a second changeover switch having a movable contact and two fixed contacts, said two fixed contacts being connected respectively to the other end of each of said excitation windings, a cam device for controlling the movable contact of said second changeover switch, a motor for driving said alternator and also driving said cam device to operate said second changeover switch so as to close the fixed contacts of said second changeover switch alternately in accordance with each half period of the alternating voltage; so that in the absence of an error voltage the first and second changeover switches are operated during any one period of said alternating voltage in opposite directions so as to prevent the energisation of either of the two excitation windings of the control motor, and so that when an error voltage is present said first and second changeover switches operate to allow the energisation of either of said excitation windings only when said control motor will operate to drive the slider of said potentiometer to effect a reduction of said error voltage.

References Cited by the Examiner
UNITED STATES PATENTS

| | | | |
|---|---|---|---|
| 2,472,566 | 6/49 | Brown et al. | 318—297 |
| 2,497,514 | 2/50 | Palmer | 318—29 |

JOHN F. COUCH, *Primary Examiner.*